No. 780,856. PATENTED JAN. 24, 1905.
C. BREITSCHWERTH.
MOLDING MACHINE.
APPLICATION FILED OCT. 9, 1902.
3 SHEETS—SHEET 2.
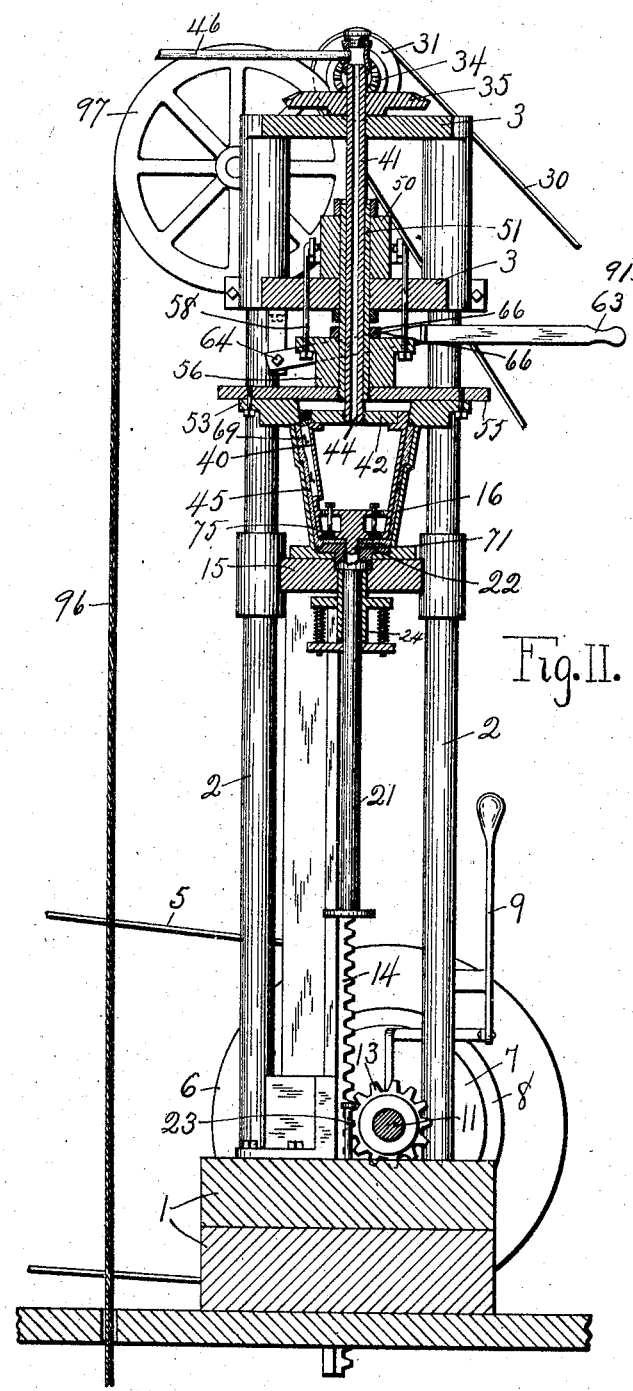
Fig. II.
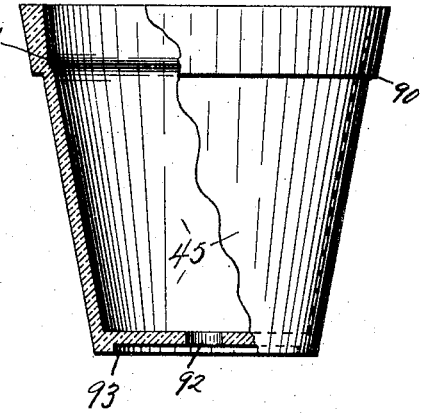
Fig. VIII.
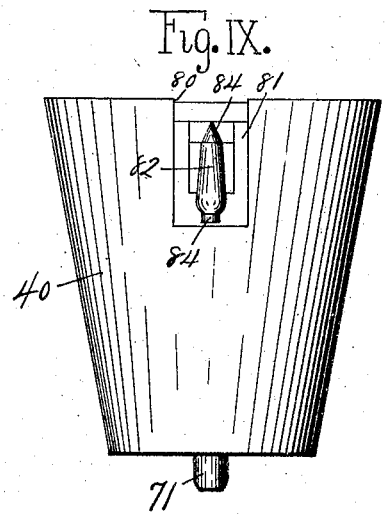
Fig. IX.
WITNESSES:
CC Schorneck
M. B. Smith
INVENTOR
Conrad Breitschwerth
BY
Alfred Wilkinson
ATTORNEY

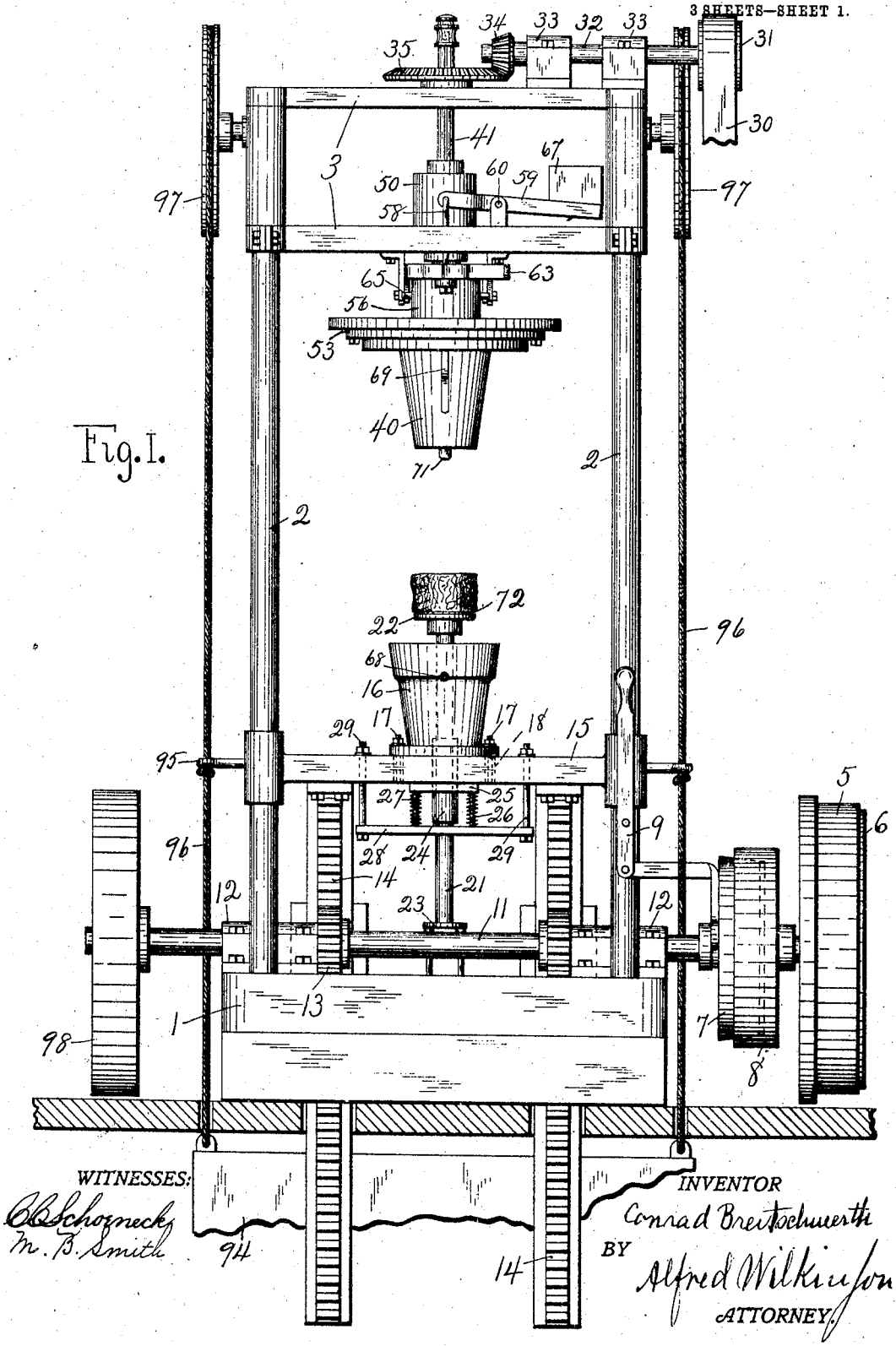

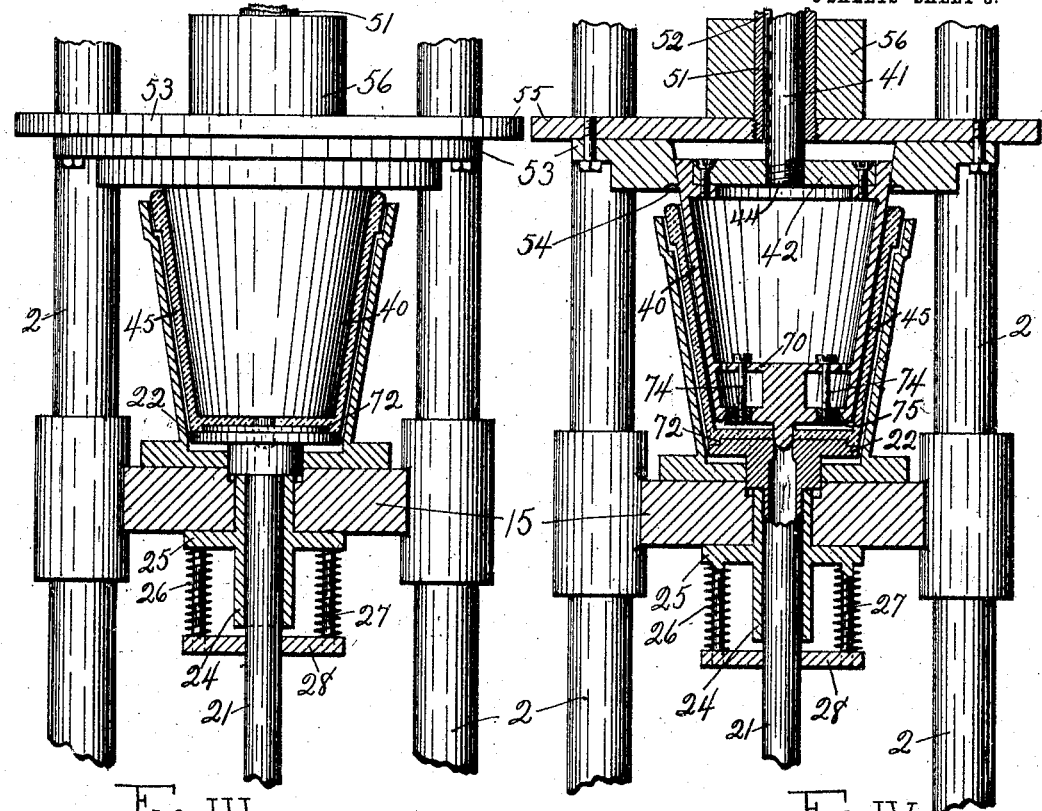
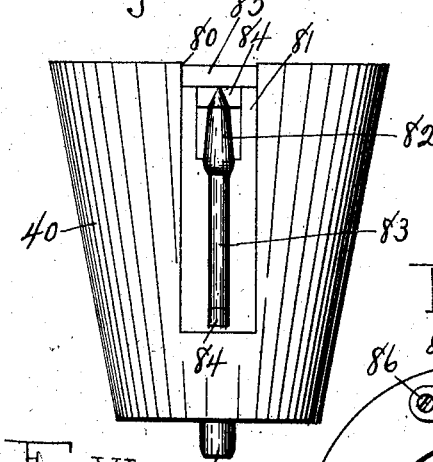
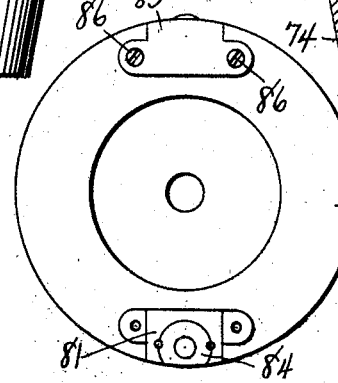

No. 780,856. Patented January 24, 1905.

UNITED STATES PATENT OFFICE.

CONRAD BREITSCHWERTH, OF SYRACUSE, NEW YORK, ASSIGNOR OF ONE-HALF TO JAMES C. BUTLER, OF SYRACUSE, NEW YORK.

MOLDING-MACHINE.

SPECIFICATION forming part of Letters Patent No. 780,856, dated January 24, 1905.

Application filed October 9, 1902. Serial No. 126,589.

*To all whom it may concern:*

Be it known that I, CONRAD BREITSCHWERTH, a citizen of the United States, residing at Syracuse, in the county of Onondaga and State of New York, have invented certain new and useful Improvements in Molding-Machines; and I do hereby declare the following to be a full, clear, and exact description of the invention, such as will enable others skilled in the art to which it appertains to make and use the same.

This invention relates to a machine for molding flower-pots, in which the moistened clay is compressed into the desired form between the hollow mold and the core fitted thereto, and has as its object the production of a superior pot made of soft or plastic clay instead of the hard clay heretofore used in molding-machines.

As is well known, soft or plastic clay is a better material for flower-pots and similar articles than hard clay, and the pots of soft clay heretofore made by hand are of better quality; but to increase the production molding-machines have been introduced and largely used. In such machines soft clay could not be used, because a pot in the machine formed thereof would be so tender that it would be difficult, if not impossible, to release and remove it from the core and mold without bending, buckling, or in some way distorting the freshly-made and soft pot. Therefore it has universally been necessary to use hard clay with such molding-machines in order that the newly-molded pot in the machine might have sufficient strength to permit it to be withdrawn without injury. However, hard clay being less tough and cohesive than soft clay is liable to crack, particularly around the upper edge, where the clay spreads as it is forced up, making a weaker pot, and also into such cracks the oil enters, preventing the uniting of the parts, which weakness develops in use, whereas pots formed of soft clay remain solid and perfect and are not liable to crack, and there being no cracks no oil can enter them. Furthermore, great pressure and much greater power is necessary to form the hard clay in the mold.

My invention lies in a new means for separating the pot from the core and mold in perfect safety, so that even large-size pots can be formed in a machine of soft clay; and it consists, essentially, in the introduction of compressed air between the molded pot and one or more of the molding-surfaces to separate the pot from the latter. In the construction of machine here shown, which has proved successful in practical use, I introduce the compressed air into the interior of the core, whence it is permitted to pass at the proper time to the exterior of the core, separating and releasing the pot from the core, and in connection therewith I use a carrier to form the bottom of the pot supported in the base of the mold on springs, which are compressed as the pot is molded, but expand, retaining the carrier and the pot against the core for an instant as the mold is withdrawn, thus releasing the pot from the mold while it is still held against the core and immediately releasing and separating it from the core by the compressed air, which need not be of a high degree of compression. By these means I am able to mold by machinery a superior pot made of the natural soft clay and with less power than in the use of hard clay.

My invention is particularly useful in the production of larger pots, because hard clay is not so liable to crack in the smaller sizes and does well enough therefor.

I do not limit myself to any particular construction or arrangement of parts, for these may be much varied, and any suitable mechanism and power may be used to operate the parts of my machine. I have also added certain auxiliary parts to improve the quality of the pot, such as rollers journaled in the edge of the core to compress the clay and form the flange at the upper edge of the pot and a collar arranged above the core to cut off the surplus clay and finish the upper margin of the pot.

My invention is illustrated in the three sheets of drawings herewith, in which the same reference-numerals are used as in the specification.

Figure I is a front elevation of my machine, showing the parts at the beginning of the operation. Fig. II is a vertical cross-section through the core and mold at right angles to Fig. I, showing the parts forced together to form the pot. Fig. III is an enlarged cross-section of the mold and adjacent parts with the core in elevation, showing the parts with the mold withdrawn and the pot still supported against the core. Fig. IV is similar to Fig. III, but with the core and adjacent parts in section and the pot separated therefrom. Figs. V, VI, and VII are respectively top plan, side elevation, and vertical cross-section of a core provided with my new rollers. Fig. VIII shows a pot in elevation and with portions broken away in section. Fig. IX corresponds to Fig. VI and shows a simple modification in the construction of the forming-roller.

In the figures, 1 indicates the base, of any suitable construction; 2 2, the frame-rods carried thereon; 3 3, the top plates of the frame; 5, the belt on pulley 6 from any suitable source of power and connected to operate the main shaft 11 in bearings 12 by any suitable means, as clutch mechanism, of which 8 is the member connected to the pulley 6; 7, the other member, thrown into and out of engagement by lever 9, suitably journaled and connected to rotate with main shaft 11 by means of a suitable spline.

13 13 are gears on the main shaft engaging with racks 14, supporting the platform 15, fitted to the frame-rods and carrying the interchangeable mold 16, secured in position by bolts 17, preferably fitted to slots 18 for adjustment.

Through a central hole in the platform and base of the mold extends the tubular follower 21, on the upper end of which is arranged the carrier 22, fitted to the base of the mold to form the bottom of the pot and to sustain the molded pot, as hereinafter described. As the mold descends the lower end of the follower strikes a suitable stop 23 to sustain the carrier above the mold for the reception of the ball of clay, as shown in Fig. I. To the upper end of the follower and engaging with the shoulder thereon immediately below the carrier is fitted the sleeve 24, having integral plate 25, sustained by a spring-support on hanger 28, secured to platform 15 by hanger-bolts 29. This plate 25 is provided with guide-pins 27, fitting openings in the hanger, and is supported by springs 26, which may be suitably arranged around the guide-pins.

30 indicates a suitable belt fitted to pulley 31 on counter-shaft 32 in bearings 33 and carrying bevel-pinion 34 to engage with bevel-gear 35 on core-shaft 41 to rotate the core 40 while the pot is being molded thereon. The core is suspended on the lower end of the tubular core-shaft by core-plate 42, fitted to the threaded end 44 of the core-shaft. The core is preferably made hollow for the introduction of the compressed air from any suitable source of supply through the pipe 46 to the upper end of the tubular core-shaft, whence it is permitted to pass to the exterior of the core around its bottom and sides by the construction best shown in Fig. IV. The core is provided in its interior with integral perforated web 70, carrying on bolts 74 the beveled ring 75, fitting a corresponding opening in the bottom of the mold. On the web is suitably sustained the stud 71 for forming the hole in the bottom of the pot, the punched-out pieces of clay dropping down through the hollow follower. The carrier may be shouldered at 72 to countersink the bottom of the pot. By this construction when the pot is being formed the beveled ring fits tight in the bottom of the mold and the compressed air cannot pass out, as shown in Fig. II; but when the pressure is withdrawn the beveled ring drops a trifle, permitting the compressed air to pass out and separate the pot from the mold, as best shown in Fig. IV.

To form a well-finished upper edge to the pot, I have provided a rotating and vertically-reciprocating finisher 53, having the annular groove 54 and operated by any suitable mechanism. As here shown, the finisher is supported to rotate with the core on the finisher-plate 55, secured to the lower end of tubular finisher-shaft 51, provided with feather 52, engaging with corresponding spline in core-shaft 41, so that the finisher may be elevated and depressed while rotating with the core. The hub 50 is secured to the upper end of finisher-shaft 51 to engage with lower top plate 3 and limit the downward movement of the finisher. The finisher is normally retained in upper non-operative position by the non-rotating collar 56, engaging with nut 66, secured to finisher-shaft 51, and is there sustained by means of counterpoise weight 67 on lever 59, suitably journaled at 60 and connected to the collar by hangers 58. The finisher is depressed to engage with the upper edge of the pot by means of lever 63, suitably journaled at 64 and engaging with pins 65 or other projections on the collar 56. The finisher, like the core and mold, is interchangeable for various sizes of pots. In Figs. I and II, where this construction is best shown, I have also shown vent 68 in the mold for the air and the forming-rib 69 sometimes arranged in the surface of the core to perfect the pot.

In Figs. V, VI, and VII, I have shown a new construction of core provided with antifriction forming-rollers or rotating formers slightly to compress the clay after the pot is molded and to insure the formation of a perfect upper portion and exterior shoulder. The core is cut out at 80 to receive a block 81, provided with upper and lower bearings 84 for this rotating former, composed of integral head 82 and shaft 83, of which the shaft projects slightly beyond the surface of the core, and the lower part of the head projects a little more, it being essential that there should be more or less outward inclination at all parts of this rotating former toward its upper end, so as not to interfere with the withdrawal of the pot. The rotating former and its block are retained in position in the cut-out or groove formed in the periphery of the core by the top plate 85, secured to the core by bolts or screws 86. Immediately upon the formation of the pot 45 by the elevation of the mold this rotating former is brought into operation by the rotation of the core to slightly compress the clay, making the pot tougher and smoother both on its inside and outside surfaces. The head or enlarged upper portion of the rotating former insures the outward compression of the clay filling the angle of the mold and making a clean square shoulder 90 to engage with the upper margin of the pot below it when nested, as for transportation, and forming the interior of the pot opposite the shoulder with a very slight and clean curve 91. 92 indicates the hole in the bottom of the pot punched out by stud 71, and 93 is the countersunk base formed by shoulder 72 on carrier 22. These rotating formers are particularly adapted for the larger sizes of pots, and in Fig. IX, I have shown a variation in construction of the rotating former in which the shaft 83 is omitted. This former is particularly adapted for medium-size pots.

To operate the machine, the ball of soft or plastic clay is set on the follower and the parts suitably oiled. The power is then thrown into operation to elevate the platform and mold to compress the clay against the core and form the pot. The finisher is depressed to finish the top of the pot and the power then disconnected, permitting the mold to drop a trifle. Immediately the power is again connected, reëlevating the mold against the molded clay to complete and insure a perfect pot. The power is then a second time disconnected and the mold permitted slowly to descend, checked, if necessary, by the hand of the operator on the wheel 98, when the mold releases itself from the pot, which is temporarily retained against the core by means of the carrier and the expansion of springs 26. As the mold continues slowly to descend the carrier is first slightly withdrawn by engagement therewith of shoulder on upper end of follower, relieving the pressure on the bottom of the core, when the compressed air forces its way out through the annular opening around the bottom and sides of the core, releasing the pot gently but effectively therefrom, and the pot, released from both the mold and the core without injury, remains firmly supported on the carrier ready to be removed, to be first dried and then placed in the kiln and burned.

94 is a suitable counterpose for platform and mold connected to ears 95 thereon by ropes 96 passing over wheels 97.

Having thus described my invention, what I claim, and desire to secure by Letters Patent, is—

1. In a machine for molding clay vessels, the combination with a concave mold and a convex core fitted thereto, of means to support the core and mold, means to force them together to form the clay arranged between them and means to introduce compressed air through openings in the core-bottom to the inner surface of the vessel, to release the vessel therefrom.

2. In a machine for molding clay vessels, the combination with a concave mold, of a hollow core having perforations in its lower portion, means to support the core and mold, means to force them together to form the clay arranged between them, and means to introduce compressed air into the hollow core to pass out through the perforations in its base, releasing the molded vessel from engagement with the core.

3. In a machine for molding clay vessels, the combination with a suitable standard, of a hollow core having perforations in its base, a hollow core-shaft sustaining the core on the standard, means for supplying condensed air through the core-shaft to the interior of the core, to pass out through the base-openings within the vessel and around the core, a concave mold suitably supported on the standard beneath the core and means to elevate the mold against the core to form the plastic clay arranged between them.

4. In a machine for molding clay vessels, the combination with a suitable standard, of a hollow, convex core suitably supported thereon having openings in its base, means to close said openings while the vessel is being formed by the pressure of the mold against the core, the concave mold suitably supported on the standard, means for elevating the mold against the core and to form the clay arranged between them and means for introducing condensed air into the interior of the core.

5. In a machine for molding clay vessels, the combination with a suitable supporting-standard, of a tubular core-shaft suitably supported thereon, a hollow core having an opening in its base supported on the core-shaft, means to rotate the core and shaft, means to close the opening in the core-base while the vessel is being formed, a concave mold suitably supported on the standard, means to elevate the mold against the core to compress and form the clay between them, means to withdraw the mold, and means to supply condensed air to the core-shaft and core during the operation of the machine.

6. In a machine for molding clay vessels, the combination with a suitable supporting-standard, of a tubular core-shaft, a hollow core supported thereon having an annular opening in its base, an annular ring fitted thereto and suitably connected to the core to be forced upwardly to close the opening while the vessel is being formed, of a concave mold suitably supported on the standard, means to elevate the mold against the core and to withdraw it therefrom, a pipe connecting with the core-shaft, and means to supply condensed air thereto to release the formed vessel from the core when the pressure of the mold is withdrawn.

7. In a machine for molding clay vessels, the combination with a suitable supporting-base, frame-rods arranged thereon, top plates supported on the upper end of the frame-rods, a tubular core-shaft vertically supported in the top plates, a core-plate fitted to the lower end of the core-shaft, a hollow core secured to the core-plate and having a beveled annular opening in its base, a perforated integral web in the core-shaft, a downwardly-depending stud connected thereto, a beveled annular ring fitted to the annular opening, bolts for securing said beveled ring on the web, said beveled ring being capable of a slight vertical movement, a platform fitted to slide on the frame-rods, a concave mold arranged on the platform, means to elevate the platform and mold against the core to compress the clay and to permit it to drop therefrom when the vessel has been formed, a pipe for condensed air to the upper end of the core-shaft, and means to supply condensed air to the pipe.

8. In a machine for molding clay vessels, the combination with a suitable supporting-standard, of a convex core suitably supported thereon, a platform fitted to slide on the standard, a concave mold supported on the platform and provided with a central hole registering with a corresponding hole in the platform, a tubular follower arranged to depend through said holes, a carrier arranged on the upper end of the follower and forming the bottom of the mold, a hanger-plate supported on and below the platform, and a spring-support carried on the platform tending to maintain the carrier a short distance above the bottom of the mold.

9. In a machine for molding clay vessels, the combination with a suitable base, of vertical frame-rods arranged thereon, top plates on the frame-rods, a convex core suitably supported on the top plates, a platform fitted to slide on the frame-rods, a concave mold supported on the platform and provided with a central hole registering with a corresponding hole in the platform, a tubular follower arranged to depend through said hole or aperture, a flat carrier arranged on the upper end of the follower and forming the bottom of the mold, a hanger-plate supported below the platform, springs thereon, and an intermediate part supported on the springs and engaging with the follower tending to maintain the carrier a short distance above the bottom of the mold.

10. In a machine for molding clay vessels, the combination with a suitable base, vertical frame-rods arranged thereon, top plates on the frame-rods, a convex core suitably supported on the top plates, a platform fitted to slide on the frame-rods, a concave mold supported on the platform, means to elevate the platform and mold against the core to form the clay, a carrier having a shoulder on its upper face fitted within the mold and forming the bottom thereof, a tubular follower connected to the carrier and depending through an aperture in the base of the mold and the platform, a shoulder on the upper end of the follower, a hanger suitably suspended below the platform, a sleeve arranged around the upper end of the follower and adapted to engage with the follower-shoulder, an integral plate on said sleeve, coil-springs arranged on the hanger to engage with the plate and support the carrier a short distance above the base of the mold, and guide-pins on the integral plate depending through the springs and holes in the hanger.

11. In a machine for molding clay vessels, the combination with a suitable support, a concave mold and a convex core fitted to the mold, of means to force the mold and core together, a carrier arranged in the bottom of the mold and supported on springs a small distance above the bottom of the mold whereby the molded vessel is first released from engagement with the mold when the parts are separated, and of means to introduce compressed air between the inner surface of the molded vessel and the outer surface of the core to release the vessel from the core after it has been released from the mold.

12. In a machine for molding clay vessels, the combination with a suitable supporting-standard, of a convex hollow core thereon, a concave mold supported thereon below the core, means to force the mold upwardly on the standard to form the clay arranged between it and the core, of a carrier fitted to the mold, springs supporting the carrier a small distance above the bottom of the mold, whereby, when the pressure is relieved the molded vessel is first disengaged from the mold, and means to introduce compressed air to the interior of the core whence it passes out when the pressure is relieved to disengage the molded vessel from the core after it has been disengaged from the mold.

13. In a machine for molding clay vessels, the combination with a suitable supporting-base, frame-rods arranged thereon, top plates supported on the upper end of the frame-rods, a tubular core-shaft vertically supported in the top plate, a core-plate fitted to the lower end of the core-shaft, a hollow core secured to the core-plate and having a beveled annular opening in its base, a perforated integral web in the core-shaft, a downwardly-depending stud connected thereto, a beveled annular ring fitted to the annular opening, bolts for securing said beveled ring on the web, said beveled ring being capable of a slight vertical movement, a platform fitted to slide on the frame-rods, a concave mold supported on the platform, means to elevate the platform and mold against the core to form the clay, a carrier having a shoulder on its upper face fitted within the mold and forming the bottom thereof, a tubular follower connected to the carrier and depending through an aperture in the base of the mold and the platform, a shoulder on the upper end of the follower, a hanger suitably suspended below the platform, a sleeve arranged around the upper end of the follower and adapted to engage with the follower-shoulder, an integral plate on said sleeve, coil-springs arranged on the hanger to support the plate and maintain the carrier a short distance above the base of the mold, guide-pins on the integral plate depending through the springs and holes in the base of the carrier, a suitable source of condensed air, a pipe therefrom to the core-shaft, and means to rotate the core-shaft, core-plate and core.

14. In a machine for molding clay vessels, a convex tapering core arranged to fit within a correspondingly-formed mold and to operate in connection with the mold to form the pot, and a rotating former journaled in the periphery of the core and projecting a short distance therefrom.

15. In a machine for molding clay vessels, a convex core to fit within a correspondingly-formed concave mold and to be operated in connection therewith to form the vessel, and a rotating former journaled in the periphery of the mold and provided with a head extending outwardly a small distance therefrom, the amount of extension or projection increasing slightly from above downwardly.

16. In a machine for molding clay vessels, a core in the frame, of a tapering cone with its smaller end arranged downwardly and adapted to be operated in connection with a concave mold to form the vessel, journal-bearings in the edge of the core, and a rotating former journaled in the bearings and parallel to the edge of the core, so as to project a short distance beyond its said surface, the former consisting of an upper head having a gradually-increasing amount of projection from above downwardly, and of an integral shaft arranged below the head, said shaft having a uniform degree of projection from end to end and lesser in extent than the greatest projection of the head.

17. In a machine for molding clay vessels, the combination with a suitable supporting-frame, of a concave mold suitably arranged thereon, a convex core suitably arranged thereon above the mold, means to elevate the mold against the core to compress the clay arranged between them and to retract the mold, a finisher arranged about the upper portion of the core and having an annular groove, and means to depress the finisher after the clay has been compressed to finish the upper margin of the vessel.

18. In a machine for molding clay vessels, the combination with a suitable base, four vertical frame-rods thereon, two parallel top plates supported on the upper end of the frame-rods, a tubular core-shaft vertically supported in the top plates, a beveled gear on the core-shaft, a counter-shaft, a beveled pinion on the counter-shaft engaging with the beveled gear, means to rotate the counter-shaft and thereby the core-shaft and core during the operation of the machine, a core-plate secured on the lower end of the core-shaft, a hollow core secured to the core-plate and having a beveled annular opening in its base, an integral perforated web within the core, a tip downwardly depending from the web below the base of the core, bolts fitted to the web, an annular beveled plate secured to the lower end of the bolts and fitted to the annular opening, said annular plate being capable of a slight up-and-down movement; a tubular finisher-shaft arranged around the core-shaft, a hub secured to the upper end of the finisher-shaft, a finisher-plate secured to the lower end of the finisher-shaft, the finisher secured to the lower surface of the finisher-plate and having an annular groove to engage with the upper end of the vessel when it is formed, a nut secured on the finisher-shaft, a non-rotating sleeve arranged between the finisher-plate and said nut, a weighted lever suitably journaled and connected by hangers to said sleeve to maintain the finisher in an elevated position, and a hand-lever suitably journaled and adapted to engage with projections on said non-rotating sleeve to depress the finisher against the vessel; a platform fitted to slide up and down on the frame-rods, a concave mold secured on the upper surface of the platform by bolts fitted to slots in the platform, a carrier having a shoulder on its upper surface fitted to the lower portion of the mold and forming the bottom thereof and having a central hole, a tubular follower supporting the carrier and depending through a hole in the platform and having its opening registering with the hole in the carrier, an integral shoulder on the follower, a hanger suspended below the platform, a sleeve surrounding the upper end of the follower and adapted to engage with the follower-shoulder, an integral plate on the sleeve, coil-springs arranged between said integral plate and the hanger, guide-pins depending from the plate through the coil-springs and openings in the hanger, a suitable stop to engage with the lower end of the follower when the mold and platform are depressed to elevate the carrier above the mold, downwardly-depending racks on the platform, a main shaft, gears thereon engaging with the racks, a suitable source of power, and a clutch mechanism to be thrown into and out of operation whereby the main shaft is rotated to elevate the platform, or is thrown out of operation permitting the platform to descend.

19. In a machine for molding clay vessels, the combination with a suitable supporting-standard, of a convex core suitably supported thereon, a platform suitably supported thereon beneath the core, a concave mold arranged on the platform, a separate plate or carrier forming the bottom of the mold, a hanger-plate supported below the platform, a follower connected to the carrier and extending down through the platform and the hanger-plate, and a plurality of springs on the hanger to engage with projections, which engage with the follower, said springs tending to maintain the carrier a slight distance above the bottom of the mold.

In testimony whereof I affix my signature in presence of two witnesses.

CONRAD BREITSCHWERTH.

Witnesses:
C. C. SCHOENECK,
GEORGE MAURER.